3,753,861
BINDING ENZYMES TO CARBONYL POLYMERS
Peter Salvatore Forgione, Stamford, Conn., assignor to American Cyanamid Company, Stamford, Conn.
No Drawing. Continuation-in-part of abandoned application Ser. No. 8,089, Feb. 2, 1970. This application Mar. 13, 1972, Ser. No. 234,299
Int. Cl. C07g 7/02
U.S. Cl. 195—68            21 Claims

ABSTRACT OF THE DISCLOSURE

A hydrophilic, sulfited carbonyl polymer having a catalytically active enzyme covalently bound thereto, a method for the production thereof and a method for converting substrates to their conversion products therewith, are disclosed.

CROSS-REFERENCE TO RELATED APPLICATION

This application is a continuation-in-part of my copending application Ser. No. 8,089, filed Feb. 2, 1970, and entitled products, now abandoned.

BACKGROUND OF THE INVENTION

The binding of enzymes to suitable carriers in order to insolubilize said enzymes and thereby render them repeatedly or continuously useful for the convension of enzymatically convertible substrates has been of interest in recent years. Specifically, Silman et al., Water-Insoluble Derivatives of Enzymes, Antigens and Antibodies, Annual Review of Biochemistry, vol. 35, Part II, P. D. Boyer, Editor; Annual Review Inc., Palo Alto, Calif.; pp. 873–908; 1966 discuss many methods for binding enzymes to carriers, including adsorption, inclusion inside the lattice of the carrier, covalent binding and covalent cross-linking Each of the systems produced heretofore has failed in at least one important property when used to convert substrates to their conversion products, the most critical of these properties being stability, i.e. the ability of the enzyme to remain active after long term usage thereof in a continuous conversion process.

SUMMARY

I have now found that enzymes can be covalently bound to carbonyl polymers, such as aldehyde and ketone polymers, in such a manner that the resultant covalently-bound enzyme remains catalytically active even after extensive and continuous use thereof in the conversion of enzymatically convertible substrates.

DESCRIPTION OF THE INVENTION INCLUDING PREFERRED EMBODIMENTS

As mentioned above, the compositions of the present invention are hydrophilic, sulfited polymers having a catalytically active enzyme covalently bound thereto.

By the term "hydrophilic," as used herein, is meant that the sulfited polymer having the enzyme bound thereto is swellable in or capable of taking up water but is not substantially soluble therein. That is to say, the polymer may take up and retain water such as by absorption, adsorption etc. but is insoluble therein. The polymers can contain hydrophobic members or portions provided that they also have hydrophilic portions which function as such when in contact with water. Therefore, my novel bound enzyme composition is essentially water-insoluble. It can retain water by taking it up or swelling in it, but portions of it render it water-insoluble.

The hydrophilicity of the novel compositions of the present invention may be imparted to the polymer support material or it may inherently be present in the support material. When the hydrophilicity must be imparted to the support hydrophilicity is accomplished by either sulfiting the support, water-insolubilizing the support or a combination of these treatments. That is to say, if the polymeric material to which the enzyme is to be bound is inherently water-soluble, it is sulfited to render it susceptible to enzyme binding and then treated to render it water-insoluble but hydrophilic according to the above definition. If the polymer is inherently water-insoluble, it is sulfited to render it susceptible to enzyme binding and water-soluble and is then again made water-insoluble. No treatment to render the polymer carrier water-insoluble is necessary if the carrier is hydrophilic per se according to the above definition. No criticality exists in the order of treatment to which the carrier polymer is subjected except that the enzyme binding should always be accomplished last.

As mentioned above, my novel compositions are prepared, depending, of course, upon the specific carbonyl polymer being used as a carrier, by rendering it susceptible to ultimate reaction with the enzyme. In the case of most aldehyde and ketone polymers, the polymer is first treated with a suitable sulfite or material which imparts a sulfite group onto the polymer chain such as a sulfite per se, a hydrosulfite, a bisulfite, sulfurous acid, etc. Specifically, alkali metal or alkaline earth metal sulfites, hydrosulfites or bisulfites such as sodium, potassium, calcium, ammonium etc. bisulfites; sodium, potassium, calcium, ammonium etc. sulfites; sodium, potassium, calcium, ammonium etc. hydrosulfites, aqueous sulfurous acid per se or as formed by $SO_2$ in water, and the like have been found useful for this purpose. The reaction is conducted at a temperature ranging from about 25° C. to about 90° C. at atmospheric pressure, although super-atmospheric or subatmospheric pressure can be utilized if desired, the process and others applicable being more specifically disclosed in U.S. Pat. Nos. 2,657,192; 3,271,334, hereby incorporated herein by reference. By the term "sulfiited," as used herein, is meant that the carbonyl polymer has been contacted with a sulfite so as to chemically modify it. It should not be construed, however, to necessarily mean that any added sulfite groups per se remain on the polymer after enzyme binding although such may be the case in some instances.

After the sulfite treatment, the sulfited aldehyde or ketone polymers are then immobilized e.g. insolubilized, if not already hydrophilic, as defined above, such as by chemically cross-linking them with a crosslinking agent or an immobilization agent useful for this purpose. For example, the general procedure taught in U.S. Pat. No. 3,459,710, also hereby incorporated herein by reference, can be followed. In this method, the sulfited polymer adduct or reaction product is contacted, for example, with a diamine such as ethylene diamine, tetramethylene diamine, N-methylethylene diamine, etc. at a temperature of about 0–150° C. and in the presence of a solvent.

Insolubilizing or immobilizing the sulfited aldehyde or ketone polymer can also be accomplished in a multiplicity of other ways such as by vinyl cross-linking i.e. first producing an aldehyde or ketone polymer containing unsaturation and then reacting it, after sulfite treatment, with a poly-unsaturated cross-linking agent such as divinyl benzene etc. Insolubilizing can also be effected by using any other polyfunctional compound which will cause the formation of a polymeric network via reaction with the sulfited polymer adduct through available sites such as vinyl groups, OH groups etc. Grafting of the sulfited polymer can also be accomplished to render the polymer immobilized. Additionally, the insolubilization can be effected by reacting the sulfited polymer adduct with such agents as 4-aminophenyl sulfide hydrochloride salt etc. through available groups on the ketone or aldehyde polymers.

If desired, the insolubilizing step may be accomplished first and the sulfite reaction second, the only criteria being that the resultant product is hydrophilic and in such a state so as to allow reaction thereof with the enzyme.

The enzyme is reacted with the sulfited, hydrophilic polymer, produced as disclosed above, at a temperature below that at which it, the enzyme, is deactivated. The temperatures at which specific enzymes are deactivated are well known to those skilled in the art and therefore need not be enumerated herein. Suffice it to say that generally temperatures below about 75° C., preferably from about 5° C. to about 65° C. should be used. The reaction is preferably carried out in the presence of buffers to control the pH of the reaction mixture at a desired level and with agitation, the particular pH being governed by the particular enzyme being bound, according to known techniques.

The enzyme must be bound to the sulfited carbonyl polymer in the presence of an aqueous medium, in that non-aqueous solvents generally tend to inactivate the enzymes. I have found that binding the enzyme in the presence of water generally results in the required amount of water being contained in the final composition. That is to say, I have found that at least about 5%, by weight, of the final compositions of the present invention should constitute water, with a preferred amount ranging from about 5% to about 300%, by weight. This concentration of water results in the most ideal compositions from the standpoint of their ultimate utility. If the product resulting from the enzyme binding does not inherently contain the proper amount of water, the concentration can be brought up to the required amount by merely washing with water. Excess water can be removed by drying under very mild conditions. The basic requirement, as mentioned above, of the instant compositions is that the final enzyme-polymer composition must be hydrophilic, as defined, in order that it may be utilized in the enzymatic conversion of substrates to their conversion products.

For example, in a specific embodiment, polyacrolein, a water-insoluble polymer which contains some groups with which most enzymes are reactive, is first contacted with a sulfite such as sodium bisulfite in order to render it water-soluble and more susceptible to enzyme reaction. In such a condition, however, the polymer cannot be reacted with an enzyme because recovery of any product thereof is relatively impossible. Cross-linking of the sulfite-polymer product, however, renders it gel-like in consistency and effectively hydrophilic so as to allow reaction with the enzyme. As a result, the sulfite-polyacrolein product is cross-linked with a diamine such as hexamethylene diamine. Based on theory, the result of these two reactions is that the sulfite breaks some of the heterocyclic rings of the polyacrolein creating more enzyme-reactive aldehyde groups thereon, in addition to a series of sulfite groups. The diamine reacts with some of these aldehyde groups with the formation of —CH=N— linkages between two polymer molecules, thereby cross-linking the polyacrolein. Reaction of the enzyme, e.g. invertase, forms an adduct or covalent bond between the enzyme and the other available aldehyde groups, and also may result in reaction through the sulfite groups. The resultant adduct is then comprised of a series of cross-linked groups, free aldehyde groups, heterocyclic sulfite reaction groups and bound enzyme groups. One proposed structure of such a product, although not wishing to be bound by such a structure or by the above discussion concerning the sulfite and diamine reactions since they are based primarily on theory, is the following, sodium bisulfite and hexamethylene diamine having been used:

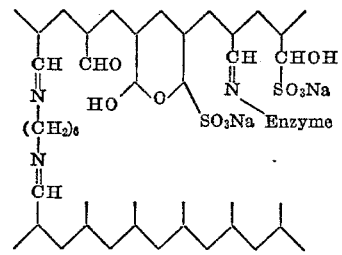

Examples of carbonyl polymers which may be utilized herein include those produced, according to any known procedure, from such aldehyde monomers as acrolein; α-alkyl acroleins e.g. methacrolein, α-propylacrolein; crotonaldehyde; 2-methyl-2-butenal; 2,3-dimethyl-2-butenal; 2-ethyl-2-hexenal; 2-decenal; 2-dodecenal; 2-methyl-2-pentenal; 2-tetradecenal and the like, alone or in admixture with up to 95%, by weight, based on the total weight of the copolymer, of each other and/or such other copolymerizable monomers known to react therewith such as unsaturated alcohol esters e.g. the allyl, crotyl, vinyl, butenyl etc. esters of saturated and unsaturated aliphatic and aromatic monobasic and polybasic acids such as acetic, propionic, butyric, valeric, adipic, maleic, fumaric, benzoic, phthalic, terephthalic etc. acids; vinyl cyclic compounds (including monovinyl aromatic hydrocarbons) e.g. styrene, o-, m-, and p-chlorostyrenes, -bromostyrenes, -fluorostyrenes, -methylstyrenes, -ethylstyrenes, various polysubstituted styrenes, e.g. di-, tri-, and tetra-chlorostyrenes, -bromostyrenes etc.; vinyl naphthalene, vinyl chloride, divinyl benzene, allyl benzene, vinyl pyridine, diallyl benzene; various α-substituted and α-substituted ring-substituted styrenes e.g. α-methyl styrene, α-methyl-p-methyl styrene, etc.; unsaturated ethers, e.g. ethylvinylether, etc.; unsaturated amides e.g. acrylamide, methacrylamide. etc.; N-substituted acrylamides e.g. N-methylolacrylamide, N-allyl acrylamide, N-methyl acrylamide, etc.; acrylates such as the methyl, ethyl, propyl, butyl etc. acrylates and methacrylates; nitriles such as acrylonitrile and other comonomers shown, for example, in U.S. Pat. No. 2,657,192, mentioned hereinabove.

Similarly, such polymers as the copolymers of ethylene and carbon monoxide and various glyoxal adducts, all well known in the art, can be utilized herein.

Examples of other carbonyl polymers which may be utilized include those produced according to any known procedure and in amounts similar to those indicated above in regard to the aldehyde polymers from such ketone monomers, as the α-methyl ketones, and including methyl vinyl ketone, methyl allyl ketone, ethyl vinyl ketone, methyl isopropenyl ketone, ethyl allyl ketone, etc. phenyl vinyl ketone, p-tolylvinyl ketone and the like. Also, I may use such polymers as poly(vinylpyridinium ketones) and haloketones; copolymers of the above-mentioned aldehyde monomers and ketone monomers with one another or with the comonomers above-disclosed as copolymerizable with the aldehydes; polyacetal and the like.

The molecular weights of the polymers used is not critical and polymers having molecular weights as low as 1000 can therefore be used.

Exemplary of the enzymes which may be utilized to produce my novel materials include, but are not limited to, the proteolytic enzymes, hydrolases, amylases, dehydrogenases, kinases, oxidases, deaminases, amidases, antigens, antibodies etc. including lactic dehydrogenase, creatine, phosphokinase, trypsin, papain, ribonuclease, alk. phosphatase, amyloglucosidase, dextranase, glucose, oxidase, glucose isomerase, amidase, penicillin amidase, chymotrypsin, β-galactosidase, pyruvate kinase, ficin, pepsin, cholinesterase, carboxypeptidase, streptokinase, plasminogen, aspergillopeptidase, urease, amylase, invertase, alcohol dehydrogenase diastase, β-glycosidase, maltase, lactase, amygdalase, lipase, steapsin, bromelain, erepsin, rennin, zymase, catalase, melibiase, pectinase, protease, tyrosinase, cytase, lysozime, cellulase, adenase, guanidase, carboxylase, inulase, vinegar, oxidase, anthrocyanase, pectinase, aldehydase, rhamnase, myrosinase, phytase, tannase, carbamase, nuclease, guanase, Dna and Rna polymerase, adenase, thrombase, chymase, cozymase and the like.

As mentioned briefly above, the products of my invention find utility in the conversion of enzymatically convertible substrates to their conversion products. More specifically, since enzymes are known to function catalytically in nature to convert various materials, known to those skilled in the art as substrates, to other materials, my bound enzyme compositions may also be used to treat said substrates. For example, since lipase converts fat to glycerol and fatty acid, invertase converts sucrose to invert sugar, lactase acts upon lactose, etc. my compositions can be used to treat fat, sucrose, lactose. etc. Further examples of substrates which may be treated herein include milk, soy isolate, cheese whey, fruit juices such as apple juice, grape juice, etc., wines, blood serum, beer, tea, mixtures of fructose and glucose and the like.

My polymer bound enzyme products, being substantially water-insoluble, enable the substrate to be converted while in aqueous solution, while still retaining the catalytic activity of the enzyme. Thus, for example, an aqueous solution of sucrose can be continually contacted with polymer bound invertase to convert the sucrose to invert sugar. The catalytic activity of the invertase remains high for a long period of time. Similarly, milk can be contacted with bound rennin continuously over long time periods e.g. over 6 months and still remain active. Although the enzyme may not remain as highly active as when initially bound, it does not lose all its activity after extended periods of use and, in fact, systems comprising bound invertase have been used for over 5 months while losing only 1/10 of their activity.

By "catalytically active" or "active catalytic activity," as utilized herein, is meant the ability or availability of the bound enzyme to convert a particular substrate to its conversion product.

The conversion of sucrose to invert sugar can be carried out under known conditions, as can be any of the conversions of the above-described substrates. The environment of the conversion in nature must merely be substantially duplicated in order to conduct the same process synthetically. In the case of invertase, for example, the sucrose is merely dissolved in water, adjusted to an acidic pH with any suitable acid, and passed through polymer bound invertase at a temperature below that which destroys the enzyme i.e. about 75° C., preferably 30–65° C. The percent conversion of the sucrose to invert sugar is, of course, governed by the flow rate of the solution through the polymer, the size of the container, temperature etc., faster flow rates, smaller container and lower temperatures effecting lower conversion. Adjustment of the flow rate, container size and temperature, however, enables conversions approaching 100%.

The following examples are set forth for purposes of illustration only and are not to be construed as limitations on the present invention except as set forth in the appended claims. All parts and percentages are by weight unless otherwise specified.

EXAMPLE 1

Hydrophilic, covalently bound invertase-polyacrolein adduct (conversion of sucrose to invert sugar)

(A) Cross-linked polyacrolein-sodium bisulfite addition complex.—0.88 part of 1,6-hexanediamine containing 3 parts of water, is slowly added, with stirring, to 44 parts of a 10% solution of polyacrolein-sodium bisulfite adduct (M.W. 80,000). The mixture is then heated to 65° C. for 10 minutes and the yellow hydrophilic product which forms is then washed until neutral with distilled water and filtered.

The wet hydrophilic adduct thus obtained is suspended in 50 parts of water and reacted with 0.104 part of invertase (twice recrystallized) which had been first dissolved in 4 parts of water. The enzyme reaction mixture (pH 6.8) is gently stirred for 18 hours at 10° C. and the resulting hydrophilic, covalently bound enzyme polymer adduct is then washed free of unreacted enzyme. Assay of the hydrophilic enzyme-polymer adduct shows high activity and about 80% of the charged enzyme has been bound.

(B) Conversion of sucrose to invert sugar.—5%, by weight, of the isolated wet cake (72% $H_2O$) converts 100 ml. of a 10% sucrose solution at pH 4.8 to 81.0% invert sugar in 15 minutes at 42° C. Similarly, 5%, by weight, of the freeze-dried polymer enzyme adduct prepared from the wet cake results in a 75.8% conversion to invert sugar using the same experimental conditions. Five months later the activity of the bound enzyme is still about 85% of its initial value.

The assay procedures (polarimetric) used are based on H. U. Bergmeyer's Methods of Enzymatic Analysis, Academic Press, New York (1963), pp. 902–3.

EXAMPLE 2

Hydrophilic, covalently bound invertase (acrolein-styrene)copolymer adduct (A) 5 parts of a copolymer of acrolein-styrene (93.8:6.2 weight ratio, respectively) are suspended in 40 parts of water containing 4.3 parts of sodium metabisulfite at pH 5.7. The mixture is stirred over nitrogen at 65° C. for 5 hours, resulting in a completely water-soluble product. To this bisulfite addition product is slowly added, with stirring, 2 parts of 1,6-hexanediamine dissolved in 10 parts of water. The reaction mixture is stirred at 70° C. for one hour. The resultant cross-linked, hydrophilic copolymer is filtered, washed to neutral pH, suspended in 20 parts of water and reacted with 4 ml. of technical grade (k=.6) invertase at 18° C. and a pH of 6.8 for 15 hours. The resulting covalently bound enzyme-polymer adduct is washed free of unbound enzyme with distilled water and filtered (7.97 parts wet).

(B) Assay of 10%, by weight, of the wet (85% $H_2O$) product of (A) with 100 ml. of 10% sucrose solution (same experimental conditions as Example 1(B) above) results in a 34% conversion to invert sugar. The enzyme remains active (70% of original activity) after 3 months usage in a batch process. Ninety percent of the enzyme charged is bound.

EXAMPLE 3

Hydrophilic, covalently bound invertase (acrolein-acrylonitrile) copolymer adduct (A) 10 parts of a copolymer of acrolein-acrylonitrile (93.1:6.9 weight ratio, respectively) are suspended in 82 parts of water containing 8.6 parts of sodium metabisulfite at pH 5.6. The mixture is stirred at 60–70° C. over a nitrogen atmosphere until solubilized. 22 parts of the above bisulfite addition product are then reacted with 0.88 part of 1,6-hexanediamine in 15 parts of water for 20 minutes at 73° C. The resultant cross-linked, hydrophilic copolymer is filtered and continuously washed until the washings are neutral. The yellow residue is suspended in 25 parts water and reacted with 4 ml. of technical grade (k=0.6) invertase solution at 15° C. and a pH of 6.8 for 16 hours with stirring. The covalently bound invertase-polymer adduct is repeatedly washed with distilled water until free of unbound enzyme (total weight of wet (70% $H_2O$) product after filtration: 12.7 parts).

(B) Assay of 10%, by weight, of the adduct of (A) above, with 100 ml. of 10% sucrose, using the same experimental conditions set forth in Example 1, results in a 79.5% conversion to invert sugar. Enzyme activity remains steady after 2 months continual usage in a batch process (27% loss of activity). 78 percent of the enzyme charged is bound.

EXAMPLE 4

Hydrophilc, covalently bound invertase (acrolein-acrylic acid) copolymer adduct (A) 10 parts of a copolymer of acrolein-acrylic acid (85:15 weight ratio, respectively) are suspended in 81 parts of water containing 8.6 parts of sodium metabisulfite at pH 5.6. and heated for 24 hours at 75° C. over a nitrogen atmosphere. To 22 parts of the resulting soluble bisulfite addition product is slowly added 0.88 part of 1,6-hexanediamine dissolved in 10 parts of water. The reaction mixture is stirred at 75° C. for 40 minutes and the hydrophilic product that forms is filtered and washed with water to neutral pH. The resultant yellow solid is suspended in 35 parts of water and reacted with 3 ml. of technical grade invertase (k=.6) at 10° C. and a pH of 6.8 for 17 hours. The resulting covalently bound enzyme adduct is washed free of unbound invertase with distilled water and filtered (25.3 parts wet).

(B) Assay of 5%, by weight, of the wet (78% $H_2O$) product of (A) above, with 100 ml. of 10% sucrose solution (same experimental conditions as Example 1) results in a 43.4% conversion to invert sugar. Activity of the bound enzyme remains relatively steady after 7 weeks of use. 69 percent of the enzyme is bound.

EXAMPLE 5

Hydrophilic, covalently bound invertase-polymethacrolein adduct (A) 15 parts of polymethacrolein are treated with 100 parts of water containing 11 parts of sodium metabisulfite at pH 5.7 at 65° C. for 20 hours over a nitrogen atmosphere. The resulting bisulfite adduct is then treated with 4.2 parts of 1,6-hexanediamine dissolved in 20 parts of water for 25 minutes at 68° C. The resultant hydrophilic cross-linked polymer is then washed to neutral pH with water and filtered. The wet cake is suspended in 100 parts of water and reacted with 6 ml. of technical grade invertase (k=0.6) at 16° C. and a pH of 6.8 for 18 hours. The resulting covalently bound enzyme is washed free of unbound invertase with distilled water and filtered.

(B) Assay of 5%, by weight, of the wet (75% $H_2O$) cake of (A) above, with 100 ml. of a 10% sucrose solution (see above experimental data—Example 1) results in a 51% conversion to invert sugar. Stability and percent binding of enzyme are substantially the same as the product of Example 1.

EXAMPLE 6

The procedure of Example 5 is again followed except that a methacrolein-styrene (50:50) copolymer (U.S. Pat. 2,945,006) is substituted for the polymer used therein. Subsequent adduct formation, cross-linking and washing results in an invertase bound polymer system which effects a 62% conversion of sucrose to invert sugar. The percent binding of enzyme and the activity over a period of time of the product are approximately equivalent to that of Example 2.

EXAMPLE 7

Hydrophilic, covalently bound invertase poly(methylvinyl ketone) adduct (A) 10 parts of poly(methylvinyl ketone) are treated with 80 parts of water containing 8 parts of sodium bisulfite at pH 5.8 at 65° C. for 18 hours over a nitrogen atmosphere. The resulting bisulfite adduct is then treated with 1.6 parts of ethylene diamine dissolved in 16 parts of water, with stirring, for 25 minutes at 65° C. The hydrophilic polymer is then washed to neutral pH and filtered. The wet cake is suspended in 55 parts of water and reacted with 4 ml. of technical grade invertase (k=.6) at 18° C. and a pH of 6.9 for 16 hours. The resulting covalently bound enzyme-polymer adduct is washed free of unbound invertase with distilled water and filtered (18.2 g. wet).

(B) Assay of 10%, by weight, of the wet (78% $H_2O$) product of (A), above, with 100 ml. of 10% sucrose solution (see Example 1) results in a 41% conversion to invert sugar. Over a period of use of about 7 weeks, the activity of the product drops about 21%. About 82% of the enzyme charged is bound.

Following the procedures of Example 1 or Example 7, depending upon whether an aldehyde or ketone monomer is used, except that various copolymers or other homopolymers are substituted for the polymers utilized therein, bound invertase compositions are prepared and utilized to convert sugar solutions to invert sugar. The results are set forth in Table I, below. In each instance, the amount of enzyme bound and the loss of activity is substantially equivalent to the product of Example 1.

TABLE I

| Ex. | Carbonyl polymer | Percent conversion to invert sugar |
|---|---|---|
| 8 | Acrolein-ethyl acrylate-styrene (25/20/55) | 57 |
| 9 | Acrolein-methylvinyl ketone (45/55) (m.w. 1,400) | 72 |
| 10 | Acrolein-vinyl acetate (60/40) | 61 |
| 11 | Acrolein-methyl acrylate (40/60) | 48 |
| 12 | α-methyl acrolein-methyl methacrylate (50/50) | 43 |
| 13 | Acrolein-allyl glycolate (80/20) | 82 |
| 14 | Poly(isopropenylmethyl ketone) | 56 |
| 15 | Poly(vinylethyl ketone) | 51 |
| 16 | Acrolein-glycidyl methacrylate (40/60) | 32 |
| 17 | Polyvinylmethylacetal | 28 |
| 18 | Acrolein-β-allyloxyethanol (80/20) | 47 |
| 19 | Methylvinyl ketone-methyl methacrylate (70/30) | 54 |
| 20 | Methylvinyl ketone-vinyl acetate (5/95) | 43 |
| 21 | Acrolein-butadiene (50/50) | 53 |

EXAMPLE 22

Hydrophilic, covalently bound trypsin-polyacrolein adduct 10 parts of wet (~10% solids) cross-linked polyacrolein-sodium bisulfite addition complex (as prepared in Example 1) are suspended in 40 parts of water at pH 3.5 and reacted with 0.110 part of crystalline trypsin, dissolved in 4 parts of water. The reaction mixture is stirred for 18 hours at 10° C. and at the end of this time the resulting covalently bound trypsin adduct is washed until free of unbound enzyme. Analysis of the washings at 280 m$\mu$ indicates that 78.2% of the enzyme is bound to the polymer. The wet polymer enzyme cake is freeze-dried, resulting in a product having .087 part trypsin per part of dry solids. The product, on assay, affords 14.4 units of activity per mg. of enzyme (native enzyme 66 units/mg.), therefore possessing 21.7% of the original activity. The analytical procedure used is the standard pH stat method (pH 7.9) using benzoyl arginine ethyl ester (BAEE) substrate. After 1 month at 4° C., a second analysis shows full retention of activity.

EXAMPLE 23

Hydrophilic, covalently bound trypsin-polyacrolein adduct 10 parts of wet (~10% solids) cross-linked polyacrolein-sodium bisulfite addition complex (as prepared in Example 1) are suspended in 50 parts of water at pH 9.0 and reacted with 0.100 part of crystalline trypsin, dissolved in 4 parts of water. The reaction mixture is stirred for 15 hours at 10° C., and at the end of this time the resulting covalently bound trypsin adduct is washed until free of unbound enzyme. Analysis of the washings at 280 m$\mu$ indicates that 33% of the enzyme is bound to the polymer. The wet polymer enzyme cake is freeze dried, resulting in a product having .033 part of enzyme per part of solids. The product, on assay, affords 21.7 units of activity per mg. of enzyme, or 32.4% of the original activity of native trypsin (native enzyme 66 units/mg.). The analytical procedure used is the pH stat method with BAEE substrate described in Example 22. Similar results are observed.

EXAMPLE 24

Hydrophilic, covalently bound glucose-oxidase poly(isopropenylmethyl ketone) adduct 2.5 parts of poly(isopropenylmethyl ketone) are stirred with 25 parts of water containing 2.1 parts of potassium metabisulfite at pH 5.8 for 16 hours at 75° C. over a nitrogen atmosphere. At the end of this time, 1.3 parts of 2-(2-aminoethyl)-5(6)-aminoethylbicyclo - 2.2.1 heptane in 5 parts of water are added to the above reaction mixture and stirred at 80° C. for 25 minutes. The hydrophilic adduct which results is washed to neutral pH and filtered. The wet cake is suspended in 30 parts of water at a pH of 6.1 and reacted with .025 part of glucose oxidase dissolved in 2 parts of water at 10° C. for 18 hours. The resultant covalently bound enzyme is washed free of unbound glucose oxidase with cold distilled water and filtered. Assay of 0.5% of the total wet cake (74% $H_2O$) using the standard pH stat procedure (pH 6.3) substrate:50 ml. of 1% glucose solution with excess oxygen) in which the liberated gluconic acid is titrated with standard .01 N NaOH indicates that the activity of the adduct is 18.0 units/mg./min. (native glucose oxidase assays 20.5 units/mg./min.). Over a period of 1 month, continuous charging of a 10% glucose solution saturated with oxygen shows a 20% overall deactivation of the enzyme. 90% of the enzyme is bound.

EXAMPLE 25

Hydrophilic, covalently bound invertase to unsaturated polyester-polyacrolein bisulfite graft 40 parts of distilled acrolein and 20 parts of a commercially available low molecular weight unsaturated polyester of maleic acid and dipropylene glycol containing 30% of vinyl toluene are combined with 0.5 part of $\alpha,\alpha'$-azobis-$\alpha,\alpha$-dimethyl-valeronitrile and allowed to polymerize at room temperature for 4 days under a nitrogen atmosphere. The resulting solid, crosslinked plug is chopped up to 100 mesh pieces, washed with water and filtered. A portion (10 parts) of this polyacrolein graft is treated with 8.5 parts of sodium metabisulfite and 90 parts of water at pH 5.6 at 62° C. for 18 hours over a nitrogen atmosphere. At the end of this time the hydrophilic sodium bisulfite adduct is isolated by filtration and washed with water. The wet adduct is suspended in 50 parts of water and treated with 8 ml. of technical grade invertase (k=.6) at 15° C. and a pH of 6.9 for 16 hours. The reaction mixture is washed free of unbound enzyme and assayed for activity. 5% of the wet product (82% $H_2O$) converts 100 ml. of a 10% sucrose solution (same experimental conditions as in Example 1) to 41% invert sugar. One month later the system has lost only 17% of its activity. About 70% of the charged enzyme is bound.

EXAMPLE 26

Invertase covalently bound to hydrophilic methylene bisacrylamide, cross-linked polyacrolein bisulfite adduct 90 parts of acrolein are reacted at room temperature with 10 parts of methylene bisacrylamide and 0.1 part of $\alpha,\alpha'$-azobis-$\alpha,\alpha$-dimethylvaleronitrile for 3 days under a nitrogen atmosphere. The resultant solid, cross-linked copolymer (8.3% weight percent bisacrylamide) is washed with water, filtered and dried at room temperature to constant weight. 10 parts of the dried, cross-linked copolymer are then treated with 8.6 parts of sodium metabisulfite dissolved in 82 parts of water at pH 5.6 at 65° C. with stirring for one day over nitrogen. The resultant hydrophilic bisulfite adduct is filtered and washed with water. The wet bisulfite adduct (147 parts) is suspended in 150 parts of water and treated with 12 ml. of technical invertase solution (k=0.6) with stirring at 10° C. and a pH of 6.8 for 18 hours. The reaction mixture is washed free of unbound invertase and assayed for activity. 5% of the wet product (80% $H_2O$) converts 100 ml. of 10% sucrose solution (same experimental conditions as Example 1, above) to 32% invert sugar. The stability and percent binding is about that shown in Example 25.

EXAMPLE 27

Hydrophilic, covalently bound invertase-polyacrolein adduct

To 70 parts of an 8% aqueous solution of low molecular weight polyacrolein-sodium bisulfite adduct (M.W. 10,000) are slowly added with stirring 2.4 parts of 4-aminophenyl sulfide hydrochloride salt dissolved in 30 parts of water. The mixture is then heated to 85° C. for 20 minutes, washed with water to neutral pH and filtered. The wet, hydrophilic adduct thus obtained is suspended in 45 parts of water and reacted with 5 ml. of technical grade invertase (k=0.6) for 24 hours at a pH of 6.8 at 10° C. The resultant covalently bound, hydrophilic, enzyme-polymer adduct is washed free of unbound enzyme and filtered. Assay of 10%, by weight, of this (50% $H_2O$) cake with 100 ml. of 10% sucrose solution (same experimental conditions as in Example 1) results in a 46% conversion to invert sugar. Stability results and percent polymer bound are substantially identical to the product of Example 1.

EXAMPLE 28

Hydrophilic, covalently bound invertase-polyacrolein adduct 1.5 parts of isophorone diamine, dissolved in 4 parts of water, are slowly added, with stirring, to 36 parts of a 10% solution of polyacrolein-sodium bisulfite adduct. The stirred mixture is then heated to 80° C. for 20 minutes, washed with water to neutral pH and filtered. The wet, hydrophilic adduct thus obtained is suspended in 50 parts of water and reacted with 5 ml. of technical grade invertase (k=0.6) for 19 hours at a pH of 6.9 and at 10° C. The covalently bound enzyme is washed free of unbound enzyme and filtered. Assay of 5%, by weight, of the total wet (110% $H_2O$) cake with 100 ml. of 10% sucrose (same experimental conditions as in Example 1) results in a 72% conversion to invert sugar. The bound enzyme remains substantially constant in its activity 2 weeks later. About 81% of the charged enzyme is bound.

EXAMPLE 29

Following the procedure of Example 26 except that the bisacrylamide thereof is replaced by an equivalent amount of divinyl benzene, a hydrophilic invertase bound polymeric system is recovered which effects conversion of a sucrose solution to invert sugar at a rate of 39%. The amount of enzyme bound is about 75% of that charged. The activity of the bound system drops only 18% after 5 weeks usage.

EXAMPLE 30

Hydrophilic, covalently bound glucose-isomerase-polyacrolein adduct 40 parts of wet (about 17% solids) cross-linked polyacrolein-sodium bisulfite addition complex (as prepared in Example 1) are suspended in 20 parts of 1 molar phosphate buffer, pH 7.1, containing 9,000 units of glucose-isomerase and 5 parts of glucose. The reaction mixture is stirred for 18 hours at 45° C. and at the end of this time the resulting covalently bound enzyme is washed until free of unbound enzyme. Assay of .04% of the total wet cake (83% $H_2O$) using the standard colorimetric cysteine-sulfuric acid procedure for fructose, results in a product having a total of 1600 units or 219 units activity per gram of dry support. After 4 months the bound enzyme loses only 50% of its activity when used in a continuous column process.

EXAMPLE 31

Hydrophilic, covalently bound glucoamylase-polyacrolein adduct 10 parts of wet (20.1% solids) cross-linked polyacrolein-sodium bisulfite addition complex (as prepared in Example 1) are suspended in 30 parts of 0.1 M phosphate buffer pH 5.6 and reacted with 5 parts of a commercially available glucoamylase solution. The reaction mixture is stirred for 18 hours at 25° C. and at the end of this time the resulting covalently bound enzyme is washed until free of unbound enzyme. Assay of .05% of the total wet cake using the standard colorimetric procedure for reducing sugars (3.5-dinitrosalicyclic acid-Carbohydrate Chemistry, vol. 4, p. 67, Ed. R. Whistler; substrate: α-amylase solubilized 15% starch solution) indicates the activity of the product to be 890 units per gram of dry support. This activity represents 40 mg. enzyme bound per gram of dry support (based on 22 units/mg. native glucoamylase).

This bound enzyme (80% $H_2O$) reacts with 100 ml. of a 25% soluble solution with less than 20% overall deactivation after 30 days.

EXAMPLE 32

Hydrophilic, covalently bound catalase-polyacrolein adduct 5 parts of wet (8.1% solids) cross-linked polyacrolein-sodium bisulfite addition complex (as prepared in Example 1) are suspended in 30 parts of water at pH 7.2 and contacted with 0.100 part of crystalline catalase. The reaction mixture is stirred for 18 hours at room temperature and at the end of this time the resulting covalently bound catalase is washed with distilled water until free of unbound catalase. Assay of 5% of the total wet cake (92% $H_2O$) using the standard iodometric procedure (Methods of Enzymatic Analysis, Ed. H. A. Bergmeyer) with hydrogen peroxide substrate indicates the activity of the adduct is 6020 units/g. dry support or 10.0 mg. catalase per gram dry support (based on assay of native catalase which is 600 units/mg. enzyme). Activity of the bound catalase drops only 13% after 1 month of continual use.

EXAMPLE 33

Hydrophilic, covalently bound invertase-polyacrolein adduct (A) 150 parts of wet (20% solids) cross-linked polyacrolein-sodium bisulfite addition complex (as prepared in Example 1) are suspended in 200 parts of technical grade invertase solution (k=.6) at pH 6.3. The reaction mixture is stirred for 48 hours at 6° C. and at the end of this time the resulting covalently bound invertase is washed until free of unbound enzyme and filtered (180 parts).

(B) Assay of .05% by weight of the total wet (80% $H_2O$) product with standard 10% sucrose solution (same experimental conditions as Example 1(B) results in a 8.5% conversion. This represents 150 mg. invertase bound per gram of dry support. After 2 months the bound enzyme retains 93% of its original activity.

EXAMPLE 34

Water-solubilization of polyacrolein with sodium sulfite (A) 5 parts of polyacrolein are suspended in 100 parts of water containing 12.6 parts of sodium sulfite. The mixture is stirred over nitrogen at 50° C. for 48 hours at pH 5.9 resulting in a completely water-soluble product. To this sulfite addition product is slowly added, with stirring, 3 parts of 1,6-hexanediamine dissolved in 10 parts of water. The reaction mixture is stirred at 60° C. for 10 minutes. The resultant cross-linked, hydrophilic polymer is filtered, washed to neutral pH, suspended in 10 parts of water and reacted with 10 ml. of technical grade (k=.6) invertase at 4° C. for 40 hours at pH 7.0. The resulting covalently bound enzyme-polymer adduct is washed free of unbound enzyme with distilled water and filtered (9.6 parts wet).

(B) Assay of 1.6%, by weight, of the wet (78% $H_2O$) product of (A) with 100 ml. of 10% sucrose solution (same experimental conditions as Example 1(B) above) results in a 19.1% conversion to invert sugar. 12.8 mg. of enzyme are bound per gram of dry support. Continual use of the bound invertase for 3 months results in only a 13% loss in activity.

EXAMPLE 35

Water-solubilization of polyacrolein with sodium hydrosulfite (A) 1 part of polyacrolein is suspended in 100 parts of water containing 17.4 parts of sodium hydrosulfite ($Na_2S_2O_4$). The mixture is stirred over nitrogen at 50° C. for 72 hours, resulting in a completely water-soluble product. To this solubilized addition product is slowly added ,with stirring, 1.5 parts of 1,6-hexanediamine dissolved in 12 parts of water. The reaction mixture is stirred at 60° C. for 10 minutes. The resulting cross-linked, hydrophilic polymer is filtered, washed to neutral pH, suspended in 20 parts of water and reacted with 10 ml. of technical grade (k=.6) invertase at 4° C. for 48 hours at pH 7.0. The resulting covalently bound enzyme-polymer adduct is washed free of unbound enzyme with distilled water and filtered (4.05 parts wet).

(B) Assay of 2.3%, by weight, of the wet (80% $H_2O$) product of (A) with 100 ml. of 10% sucrose solution (see Example 1(B)) results in a 22.6% conversion to invert sugar. The amount of enzyme bound to polymer is 16.6 mg. enzyme per gram of dry support. A slight loss of activity (12%) is observed after continual use of the bound enzyme over a period of 2 months.

EXAMPLE 26

Water-solubilization of polyacrolein with sulfurous acid

The procedure of Example 34 is again followed except that the sodium sulfite is omitted. Instead sulfur dioxide gas is continually bubbled through the suspension of polyacrolein in water. Upon reaction of the cross-linked sulfited polymer with invertase, a bound adduct having a water content of 87% is recovered. 14.6 mg. of enzyme are bound per gram of dry support. After 86 days of continual usage in the column, the bound enzyme has lost only 12.5% of its original activity.

EXAMPLES 37–40

Following the procedure of Examples 34–36 depending upon the class of sulfite used, various other sulfites are substituted for the sulfites used therein. Different carbonyl polymers are also used. The results are set forth below in Table II.

TABLE II

| Example | Sulfite | Carbonyl polymer | Enzyme bound | Percent enzyme bound | Percent activity lost after 3 months |
|---|---|---|---|---|---|
| 37 | Calcium sulfite | That of Ex. 2 | Rennin | 82 | 11 |
| 38 | Potassium hydrosulfite | That of Ex. 7 | Invertase | 90 | 8 |
| 39 | Ammonium bisulfite | That of Ex. 12 | Pepsin | 71 | 27 |
| 40 | 8% aqueous sulfurous acid | That of Ex. 20 | Tyrosinase | 67 | 19 |

EXAMPLE 41

0.5 ml. of rennin is slowly dissolved in a suitable reaction vessel with minimum agitation into a phosphate buffer (0.01 M, pH 5.8). This solution is then slowly added to 1 part of wet (80% $H_2O$) polyacrolein, modified as in Example 1, slurried in phosphate buffer (0.01 M, pH 5.8). The pH of the mixture is adjusted to 5.8 and the reaction stirred at 4° C. for 18 hours. The adduct is washed with large amounts of phosphate buffer (pH 5.8, 0.01 M) and then with deionized water until there is no detectable activity in the washings. The adduct is filtered and a sample assayed for activity. The bound enzyme loses only 25% of its activity upon treatment of milk over a period of 3 weeks.

Following the procedure of Example 41, various other enzymes are bound to the modified polymer used therein. The conditions of reaction and results thereof are shown in Table III, below.

TABLE III

| Ex. | Enzyme | Mg. enzyme/g. support | Phosphate buffer | G. wet support | pH of binding | Agitation | Reaction temp. (° C.) | Reaction time (hrs.) | Percent binding | Percent $H_2O$ | Mg. enzyme bound/g. dry support |
|---|---|---|---|---|---|---|---|---|---|---|---|
| 42 | Lactase | 20 | 0.1 M (pH 8.0) | 1 | 8.0 | Stirring | 4 | 18 | 70 | 80 | 70.0 |
| 43 | Pectinase | (1) | 0.1 M (pH 6.5) | 1 | 6.5 | Shaking | 23 | 18 | 50 | 80 | 15.0 |
| 44 | Thermoase | 20 | Malonurea, M/35 (pH 7.0) | 1 | 7.0 | do | 23 | 18 | 9.6 | 80 | 10.0 |
| 45 | Molsin 2 | 25 | 0.1 M (pH 5.0) | 1 | 5.0 | do | 4 | 18 | 25 | 80 | 30.0 |
| 46 | Prozyme-6 3 | 40 | 0.1 M (pH 6.5) | 1 | 6.5 | Stirring | 4 | 18 | 17 | 80 | 34.0 |

1 1.0 cc.
2 Trade name of a commercially available bacterial protease manufactured by Seishin Pharmaceutical Co. Ltd. Noda, Chiba, Japan.
3 Trade name of a commercially available bacterial protease manufactured by Amano Pharmaceutical Co. Ltd. Nagoya, Japan.

What is claimed is:

1. A composition comprising a hydrophilic, cross-linked aldehyde or ketone polymer containing sulfite groups chemically attached thereto, having a catalytically active enzyme covalently bound thereto through available aldehyde or ketone groups and containing at least about 5%, by weight, based on the weight of the composition, of water.

2. A composition according to claim 1 wherein said polymer is an aldehyde polymer.

3. A composition according to claim 1 wherein said polymer is a ketone polymer.

4. A composition according to claim 2 wherein said polymer is an acrolein polymer.

5. A composition according to claim 1 wherein said polymer is polyacrolein.

6. A composition according to claim 5 wherein said polyacrolein is cross-linked with a diamine.

7. A composition according to claim 1 wherein said enzyme is rennin and said polymer is polyacrolein.

8. A composition according to claim 1 wherein said polymer is a copolymer of acrolein and styrene.

9. A method for the production of the composition of claim 1 which comprises (1) contacting an aldehyde or ketone polymer with a sulfite at a temperature of from about 25° C. to about 90° C. to produce a polymer containing sulfite groups chemically attached thereto, (2) cross-linking the resultant sulfited polymer at a temperature of fro mabout 0° C. to about 150° C. and (3) covalently binding an enzyme to the resultant cross-linked, sulfitedpolymer through its available aldehyde or ketone groups in an aqueous medium and at a temperature below about 75° C.

10. A method according to claim 9 wherein said polymer is an aldehyde polymer.

11. A method according to claim 9 wherein said polymer is a ketone polymer.

12. A method according to claim 9 wherein said polymer is an acrolein polymer.

13. A method according to claim 9 wherein said enzyme is rennin.

14. A method according to claim 9 wherein said enzyme is rennin and said polymer is polyacrolein.

15. A method for converting an enzymatically convertible substrate to its conversion product which comprises contacting said substrate with the composition of claim 1.

16. A method for converting an enzymatically convertible substrate to its conversion product which comprises contacting said substrate with the composition of claim 2.

17. A method for converting an enzymatically convertible substrate to its conversion product which comprises contacting said substrate with the composition of claim 3.

18. A method for converting an enzymatically convertible substrate to its conversion product which comprises contacting said substrate with the composition of claim 7.

19. A method according to claim 18 wherein said substrate is milk.

20. A composition according to claim 1 wherein said hydrophilic polymer is bisulfited.

21. A composition according to claim 1 wherein said hydrophilic polymer is cross-linked, bisulfited polyacrolein.

References Cited
UNITED STATES PATENTS

| 3,282,702 | 11/1966 | Schreiner | 195—63 X |
| 3,271,334 | 9/1966 | Kern et al. | 260—8 |
| 3,645,852 | 2/1972 | Axen et al. | 195—68 |
| 2,962,477 | 11/1960 | Blanchette | 260—63 |
| 2,676,138 | 4/1954 | Hinkel, Jr. | 195—63 |

OTHER REFERENCES

Kay, G., Insolubilised Enzymes, Process Biochemistry, August 1968, pp. 36–38.

DAVID M. NAFF, Primary Examiner

U.S. Cl. X.R.

99—54; 195—63, Dig. 11